S. BROADMEADOW.
Making Steel Direct from Ore.

No. 3,596. Patented May 25, 1844.

UNITED STATES PATENT OFFICE.

SIMEON BROADMEADOW, OF NEW YORK, N. Y.

MANUFACTURE OF STEEL.

Specification of Letters Patent No. 3,596, dated May 25, 1844.

*To all whom it may concern:*

Be it known that I, SIMEON BROADMEADOW, of the city of New York, in the State of New York, have made a new and useful improvement in the construction of furnaces for converting iron into steel by cementation, and in the process of manufacturing such metal.

In the ordinary mode of constructing the converting furnace the bars of iron, after being piled in the coffer, or oven, in combination with carbonaceous matter, to the proper height, are covered with a stratum of fine clay and sand, or some analogous substance, which has to be renewed every time the oven is charged. My improvement in the structure consists in the using of a permanent roof of fire stone, or fire brick, in place of the temporary covering heretofore employed. I also use a sliding shutter which is placed in front of the furnace, so that it may be brought down as required for a purpose to be presently made known. My improvement in the manufacturing of the steel after the process of cementation has been completed, consists in the taking of the bars first from the upper part of the convertory, while they are at the highest temperature to which they are to be brought, and subjecting them immediately to the action of tilting, or of rolling without the necessity of reheating. To do this a part of the upper layer of bricks which inclose the converting oven is first removed, so as to enable me to draw out the upper bars, and as the bars are successively operated upon the bricks are further removed, until the whole contents of the convertory have been tilted or rolled. As this process goes on the sliding shutter is brought down so as to inclose the part from which the bricks have been removed. By this procedure several advantages are attained in the process of manufacturing steel. Under that hitherto followed the whole charge has been allowed to cool down before removing the steel from the convertory, and this necessarily resulted in great loss of time; the bars after being removed had to be reheated in order to their being tilted, or rolled; by this reheating time was consumed, and the steel actually injured, it being a well established fact that every time steel is highly heated it is deteriorated. The steel manufactured by my improved process has proved to be very superior to that made from the same iron in the ordinary way; it has, in this particular uniformly exceeded the anticipated benefit.

Figure 1:
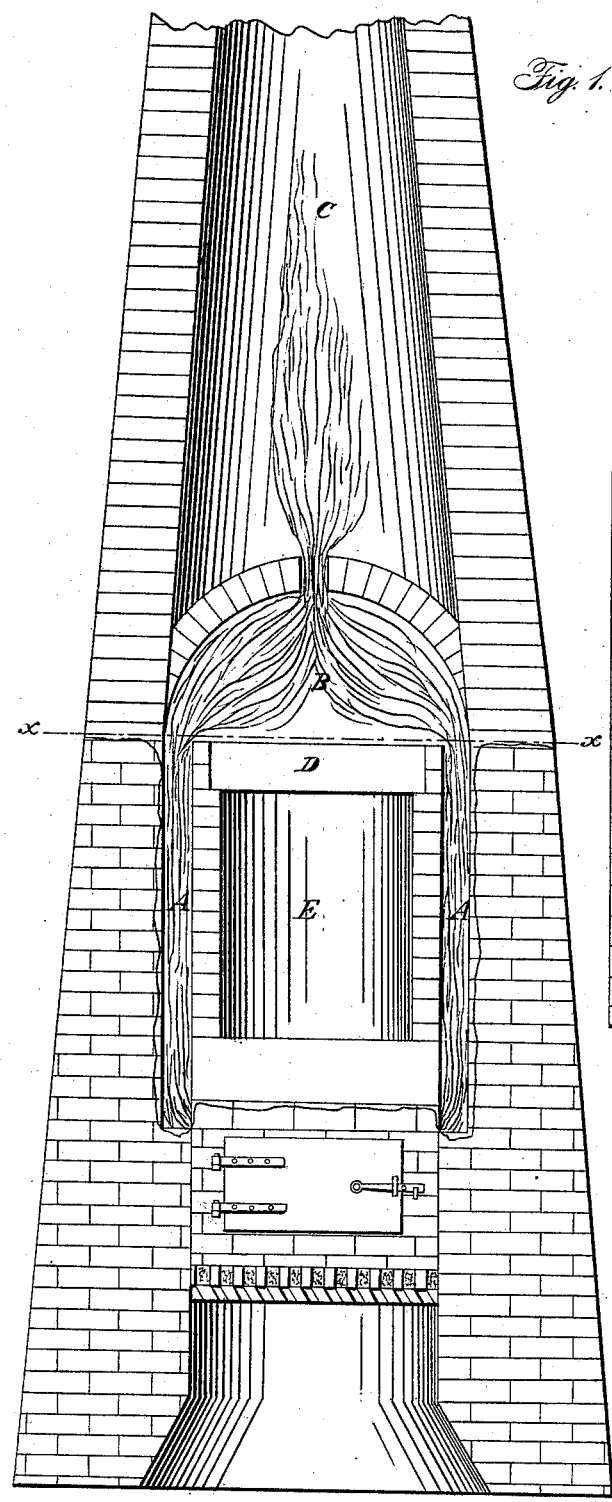
Figure 2:
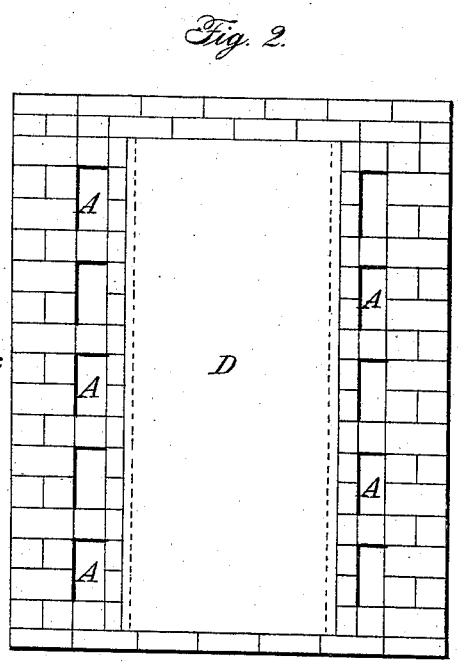

In the accompanying drawing Figure 1 is a front view of the converting furnace, the temporary brick work which is used to inclose the coffer, or oven, and likewise those that inclose the flues A, A, the arch B, and the chimney stack C, being removed. D, is the roof of fire stone, or fire clay, which extends over the whole top of the coffer, or oven E. Fig. 2, shows the top of this roof in plan, being a horizontal section of the furnace in the line $x$, $x$, of Fig. 1. D, is the roof stone, and A, A, the flues leading from the fire chamber into the arch as usual.

Having thus fully described the nature of my improvements in the construction of the furnace for converting iron into steel by cementation, and also made known my improvement in the process for manufacturing steel after the cementation has been completed, what I claim therein as new, and desire to secure by Letters Patent, is—

The improvement herein described of taking the steel from the oven in its heated state, and subjecting it to the action of rollers, or of the tilt hammer, without the necessity of reheating the bars; by which improvement said manufacture is greatly facilitated, and the quality of the steel much improved.

SIMEON BROADMEADOW.

Witnesses:
THOS. P. JONES,
EDWIN L. BRUNDAGE.